United States Patent Office.

EDWARD PAYNE, OF LONDON, ENGLAND, ASSIGNOR TO HIMSELF AND EDWARD CHAPLIN, OF MONTREAL, CANADA.

Letters Patent No. 84,574, dated December 1, 1868.

IMPROVED COMPOSITION FOR CATTLE-FOOD.

The Schedule referred to in these Letters Patent and making part of the same.

*To all whom it may concern:*

Be it known that I, EDWARD PAYNE, of London, England, have discovered a new and useful Improved Composition for Cattle-Food, by mixing refuse of grain used in brewing or distillation, or other pulp, the residuum of analogous processes, with linseed-meal, pease-meal, bran, or other farinaceous and aromatic substances, or treating the refuse matter in the same manner, but without the addition of the other substances; and I hereby declare the following to be a full, clear, and exact description of the mode of manufacturing the same.

It is a well-known fact that a large quantity of refuse arises from the operation of distillation, where the various descriptions of grain are employed, and which, to a certain extent, is economized or utilized as food for cattle, in the form of slops, while, on the other hand, the large amount of refuse arising from the employment of beets, potatoes, carrots, and other vegetables, in the process of distillation, can only be kept or used for a limited time, on account of the decay which shortly follows the operation, the same remark applying also to the slops or refuse of grain as above mentioned.

The object of my discovery is the preservation of this refuse matter, by a process to be described, and resulting in a composition of matter of great value as food for cattle, horses, and other animals, and in a concentrated form, by which decay is prevented, and the food rendered portable.

It will be evident to all practical men that the process of manufacturing this composition may be carried out in various ways. I prefer, however, to use substantially the following process:

Either before or after distillation, that is to say, after the operation of mashing, and the completion of the fermentation, or after the operation of distillation, as may be thought most advisable, usual in the process of distillation from raw or malted grain, vegetables, &c., I propose to separate the fluid portion of the wash, beer, wine, or cider, from the grains or solid matter, by pressing the same through a hair or other strainer, arranged for the purpose; after which, I subject the solid matter to gentle pressure, either by passing the mass through rollers or their equivalents, to rid it of the greater proportion of moisture. I then pass it into a tub or other vessel, furnished with an agitator. In this vessel, I add to the mass a proportion of linseed-meal, pease-meal, bran, or other farinaceous material, also aromatic substances, such, for instance, as caraway-seeds or cummin-seeds, possessing essential oils or preserving properties, which at the same time impart a flavor to the composition.

The following are about the proportions of the various ingredients employed in the composition:

To one ton of composition, I use—

| | Lbs. |
|---|---|
| Refuse, after being deprived of moisture | 1,672 |
| Linseed or farinaceous substance | 300 |
| Aromatic substances | 28 |
| Total | 2,000 |

The ingredients are then thoroughly mixed or incorporated together by the motion of the agitator. I then transfer the material, either in bags or otherwise, to a press, and subject it to a sufficient pressure to express the remaining fluid, and form it into solid cakes, which may be accomplished by hydraulic pressure or ortherwise, as thought most desirable.

The cakes so pressed are then subjected to a stove-heat, in a kiln or room arranged for the purpose of removing any remaining moisture. The composition is then ready for use for cattle.

A good article of food may also be obtained from the refuse, by simply depriving it of moisture, in the manner indicated, without the addition of the other materials, and afterwards either submitting it to pressure or not, as thought desirable.

As before stated, I am aware that this refuse matter from distillation, &c., has been fed to cattle, but only in the form of slops, or in its crude state, for the limited period after the distillation, but I am not aware that any mixture or composition analogous to the one described has been in use.

What I claim as my invention, and desire to secure by Letters Patent, is—

1. The improved composition for cattle-food, by mixing refuse of grain, either before or after distillation, or other pulp, the residuum of analogous processes, with linseed-meal, pease-meal, bran, or other farinaceous and aromatic substances, substantially in the manner and proportions described.

2. The use of the refuse matter, when treated in the same manner, but without the addition of the other substances.

In testimony whereof, I have signed my name to this specification, before two subscribing witnesses.

EDWD. PAYNE.

Witnesses:
EDWARD GORTON,
ED'D CHAPLIN.